Sept. 16, 1969 G. R. KRIEGER 3,467,798
FOOT ACTUATED REMOTE CONTROL UNIT FOR FISHING MOTORS
Filed Nov. 17, 1967 2 Sheets-Sheet 1
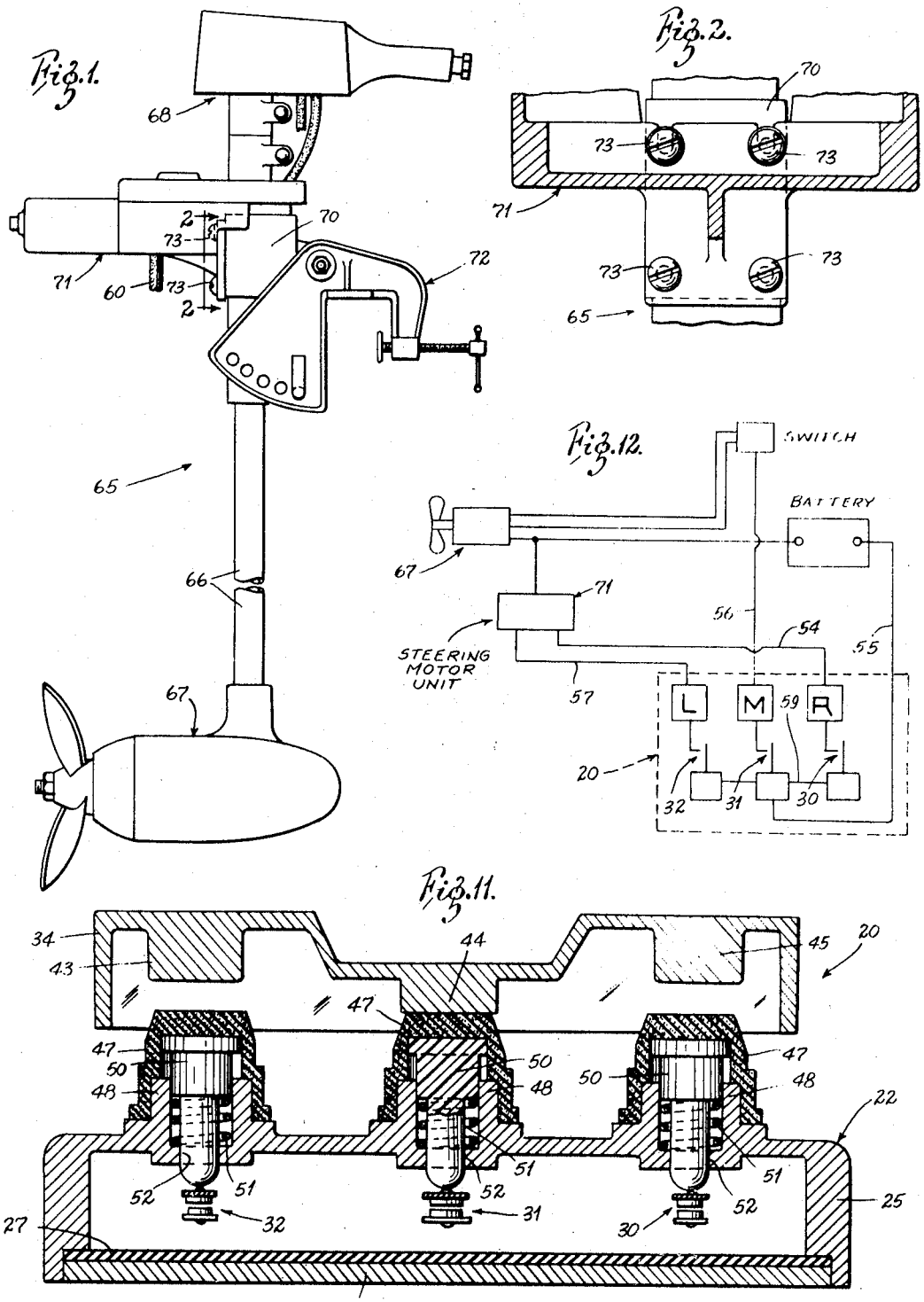
INVENTOR:
GEORGE R. KRIEGER,
BY Kingsland, Rogers, Ezell, Eilers & Robbins
ATTORNEYS Sept. 16, 1969 G. R. KRIEGER 3,467,798
FOOT ACTUATED REMOTE CONTROL UNIT FOR FISHING MOTORS
Filed Nov. 17, 1967 2 Sheets-Sheet 2
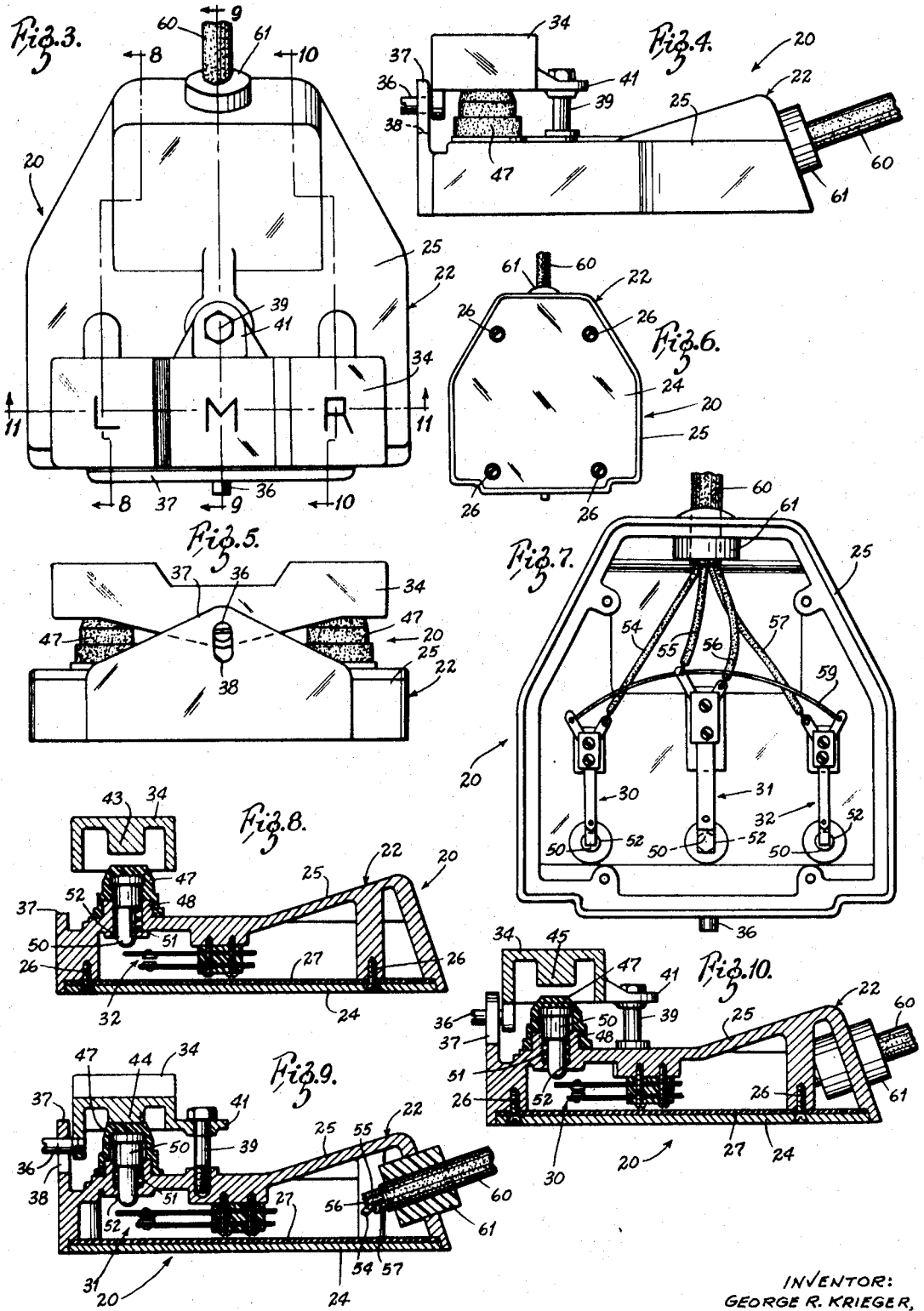
INVENTOR:
GEORGE R. KRIEGER,
BY Kingsland, Rogers, Ezell, Eilers + Robbins
ATTORNEYS United States Patent Office 3,467,798
Patented Sept. 16, 1969

3,467,798
FOOT ACTUATED REMOTE CONTROL UNIT FOR FISHING MOTORS
George R. Krieger, Glendale, Mo., assignor to Byrd Industries, Inc., Memphis, Tenn., a corporation of Tennessee
Filed Nov. 17, 1967, Ser. No. 683,867
Int. Cl. H01h 3/14
U.S. Cl. 200—86.5                            7 Claims

ABSTRACT OF THE DISCLOSURE

A foot actuated remote control unit for energizing and steeringly positioning fishing motors comprising a closed casing adapted to be disposed loose in the bottom of a boat, a central switch and two side switches operatively disposed in said casing, the central switch adapted to be connected to a fishing motor, said side switches adapted to be connected to a steering motor to position a fishing motor to right or left movement, a bridge mounted on top of said casing for rocking pivotal and vertical bodily movements, and switch actuators within said bridge for selectively closing a predetermined switch or switches upon selected rocking and bodily movement of said bridge.

BACKGROUND OF THE INVENTION

Field of the invention

The present invention relates generally to the fishing motor art, and more particularly to a novel foot actuated remote control unit for maneuvering a small boat while fishing.

Description of the prior art

Heretofore, many types of foot actuated remote controls for outboard motors and fishing motors have been developed over the last many years. The purpose is to move and steer the boat with the foot or feet to permit full free use of both hands for fishing. Many types and kinds of devices have been tried, including mechanical and electrical units, with little success.

SUMMARY OF THE INVENTION

In brief, the present novel foot actuated remote control unit for fishing motors includes a closed waterproofed casing enclosing power and right and left steering switches. On the casing is mounted a bridge for transverse pivotal and vertical bodily movement, within which are actuators for closing the switches upon selective positioning of the bridge through pivotal and bodily movements. The central switch is adapted to be connected to the fishing motor so that it and a selected side switch can be actuated simultaneously, if desired, or a selected single switch can be actuated. Necessary wiring is provided.

Therefore, objects of the present invention are to provide a novel foot actuated remote control unit for fishing motors, which is highly effective for its intended control purposes, which can be easily and conveniently used, which is of sturdy construction rendering long trouble-free use and has a minimum number of parts, which can be employed with minimal instruction, and which otherwise fulfills the objects and advantages sought therefor.

The foregoing and other objects and advantages are apparent from the following description taken with the accompanying drawings.

BRIEF DESCRIPTION OF THE DRAWINGS

FIGURE 1 is a side elevational view of a fishing motor assembly including a remote controlled steering unit, the connecting tube being broken away for conservation of space;

FIGURE 2 is an enlarged vertical cross-sectional view substantially on the line 2—2;

FIGURE 3 is a top plan view of a foot actuated remote control unit incorporating the teachings of the present invention;

FIGURE 4 is a side elevational view thereof;

FIGURE 5 is an end elevational view thereof, looking up at FIGURE 3;

FIGURE 6 is a reduced bottom plan view thereof;

FIGURE 7 is a bottom plan view thereof with the bottom plate and gasket removed;

FIGURES 8, 9 and 10 are vertical cross-sectional views taken substantially on the lines 8—8, 9—9, and 10—10 of FIGURE 3, the wiring being omitted;

FIGURE 11 is an enlarged vertical transverse cross-sectional view taken on substantially the line 11—11 of FIGURE 3; and FIGURE 12 is a wiring diagram.

DESCRIPTION OF THE PREFERRED EMBODIMENT

Referring to the drawings more particularly by reference numerals, 20 indicates generally a foot actuated remote control unit incorporating the teachings of the present invention (FIGS. 3–11). The unit 20 includes a casing 22 comprising a flat plate 24 and a cover 25 of the configuration shown separably held together by screws 26 and sealed against entry of water by a gasket 27. Insulatively mounted on the cover 25 in depending relation are three normally open switches 30, 31 and 32, which may be of the simple, two resilient blade type shown, or of other types.

A bridge 34 is mounted on the cover 25 for pivotal and vertical bodily movements by means of the horizontally disposed screws 36 mounted in the bridge 34 and extending through a slot 38 in a vertical flange 37 of the cover 25 and a vertical bolt 39 extending through an apertured ear 41 integral with the bridge 34 and threadedly mounted in the cover 25 (FIG. 9). Internally of the bridge 34 are depending bosses 43, 44 and 45, boss 44 being disposed at a lower level than bosses 43 and 45, as is clearly shown in FIGURE 11.

Mounted beneath each of the bosses 43, 44 and 45 is a rubber or plastic nipple 47 secured by adhesive or otherwise to an annular well 48 integral with the cover 25 (FIG. 11). Within each nipple 47 is a switch actuator 50 of insulative material biased to the positions of FIGURE 11 by a compression spring 51. The reduced lower end of each actuator 50 extends through an opening 52 in the well 48.

Wires 54, 56 and 57 are connected to the lower blades of the switches 30, 31 and 32, respectively, and a wire 55 is connected to the upper blade of the switch 31. A wire 59 interconnects the upper blades of the three switches 30, 31 and 32 and the wire 55, all as shown in FIGURE 7. The wires 54, 55, 56 and 57 are carried by a cable 60 leaving the cover 25 by means of a waterproof member 61.

In FIGURES 1 and 2 is illustrated a fishing motor assembly 65 comprising a hollow shaft 66 carrying an electric motor unit 67 at its lower end and a manual steering control 68 including a speed adjuster at the other end. Slidably mounted on the shaft 66 between the motor unit 67 and the manual steering control 68 is a sleeve 70 to which is bolted a remote controlled steering motor unit 71 and in opposite position a boat bracket clamp 72. FIGURE 2 illustrates the manner of connecting the unit 71 to the sleeve 70, as by bolts 73.

The switches 30 and 32 are connected electrically to the steering motor unit 71 and to a battery for energizing the former when closed to rotate the shaft 66 to the right and to the left, respectively. The middle switch 31 is connected electrically to the motor unit 67 and to a battery to energize the former when closed.

In FIGURE 12 is a wiring diagram showing the electrical connections which per se form no part of the present invention, and which may be varied as desired to meet particular needs.

It will be clear from reference to the foregoing taken with the drawings that a simple downward pressure of a foot on the bridge 34 will effect downward movement thereof bodily against the central spring 51 to move only the central actuator to close the switch 31, thereby energizing the fishing motor unit 67. If, while thus depressed, the foot is rocked to the left, FIGURE 11, the left actuator 50 will be depressed to close the switch 32, thereby energizing the steering motor unit 71 and rotating the shaft 66 to turn the boat to the left. In similar manner, the switch 30 is closed upon rocking the foot to the right. If positioning only of the motor unit 67 is desired initially, the bridge 34 is pivoted right or left from the position of FIGURE 11 by a foot without depressing the bridge 34 centrally.

It is apparent that there has been provided a foot actuated remote control unit which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention.

What is claimed is:
1. A foot actuated remote control unit for fishing motors comprising, in combination, a closed casing, a plurality of independent switches in said casing, means for operatively connecting said switches with a fishing motor and a steering motor therefor, a single foot actuatable member mounted on and outside of said casing for pivotal and vertical bodily movements, and separate means each including a portion extending through and into said casing selectively movable by said single foot actuatable member for closing a selective number of switches for implementing an action to a fishing motor.

2. The combination of claim 1 in which there are three spaced aligned switches in said casing, the center switch being connectible to a fishoing motor and the other switches to motor means for rotating the fishing motor to the right and to the left, said foot actuatable member being in the form of a bridge pivotally mounted over the center one of said three spaced aligned switches and spanning the right and left ones in a rest position.

3. The combination of claim 2 in which said bridging member is movable vertically bodily downward under pressure for closing the center switch, and means for returning said bridging member to rest position.

4. The combination of claim 3 in which said bridging member is pivotally movable from bodily depressed position to selectively close said left and right switches, and means for returning said bridging member to rest position.

5. The combination of claim 4 in which said bridging member also is pivotally movable from rest position to selectively close said left and right switches independently of closing of said center switch.

6. The combination of claim 2 and including an upwardly biased plunger member reciprocably mounted in said casing above each switch for closing the same upon depression thereof, said bridging member being selectively engageable therewith for closing selected switches.

7. The combination of claim 6 and including protective members between each plunger member and said bridging member sealing said plunger members against water and the like.

References Cited
UNITED STATES PATENTS

| | | | |
|---|---|---|---|
| 497,144 | 5/1893 | Teal | 200—86.5 |
| 2,872,542 | 2/1959 | Thompson | 200—86.5 |
| 3,287,520 | 11/1966 | Stevens et al. | 200—86.5 |
| 3,363,069 | 1/1968 | Twietmeyer | 200—159 XR |

H. O. JONES, Primary Examiner